United States Patent

Balogh et al.

[11] Patent Number: 5,938,934
[45] Date of Patent: Aug. 17, 1999

[54] DENDRIMER-BASED NANOSCOPIC SPONGES AND METAL COMPOSITES

[75] Inventors: Lajos Balogh; Agnes M. deLeuze-Jallouli; Petar R. Dvornic; Michael J. Owen; Susan Victoria Perz; Ralph Spindler, all of Midland, Mich.

[73] Assignees: Dow Corning Corporation, Midland, Mich.; Dendritech Inc., Midland, Mich.

[21] Appl. No.: 09/006,573

[22] Filed: Jan. 13, 1998

[51] Int. Cl.$^6$ ..................................................... C02F 1/42
[52] U.S. Cl. ..................... 210/688; 210/681; 210/692; 210/912; 524/83; 524/190; 524/413; 524/430; 524/440; 525/431; 525/420; 525/540; 525/477; 424/DIG. 16; 423/592
[58] Field of Search ............................... 524/83, 190, 413, 524/430, 440; 525/431, 420, 540, 477; 423/592; 210/688, 692, 681, 912; 424/DIG. 16

[56] References Cited

U.S. PATENT DOCUMENTS 5,739,218  4/1998  Dvornic et al. ......................... 525/487

OTHER PUBLICATIONS

Journal of the American Chemical Society, vol. 109, pp. 1601–1603, (1987).
Journal of the American Chemical Society, vol. 116, pp. 661–671, (1994).
Science, vol. 266, pp. 1226–1229, Nov. 18, 1994.
Angew. Chem. Int. Ed. Engl., vol. 33, No. 6, pp. 666–668, (1994).
Polymer Preprints, vol. 36, No. 2, pp. 239–240, Aug. 1995.
Journal of Materials Chemistry, vol. 7 (7), pp. 1199–1205, (1997).
Polymeric Materials Science & Engineering, vol. 77, pp. 116–117, (1997).

*Primary Examiner*—Robert Dawson
*Assistant Examiner*—Caixia Lu-Rutt
*Attorney, Agent, or Firm*—James L. De Cesare

[57] ABSTRACT

Dendritic polymer based networks consisting of well-defined hydrophilic and oleophilic (i.e., hydrophobic) domains, are capable of performing as nanoscopic sponges for electrophilic guest moieties such as (i) inorganic and organic cations; (ii) charged or polarized molecules containing electrophilic constituent atoms or atomic groups; and (iii) other electrophilic organic, inorganic, or organometallic species. As a result of such performance, the networks yield novel nanoscopic organo-inorganic composites which contain organosilicon units as an integral part of their covalently bonded matrix.

17 Claims, 3 Drawing Sheets

PAMAM REPEATING UNIT

DENDRIMER-BASED NANOSCOPIC SPONGES AND METAL COMPOSITES

CROSS-REFERENCE TO RELATED APPLICATIONS

This application is related to a prior copending application Ser. No. 08/867,143, filed Jun. 2, 1997, now U.S. Pat. No. 5,739,218, entitled "Radially Layered Copoly (Amidoamine-Organosilicon) Dendrimers", assigned to the Dow Corning Corporation and the Michigan Molecular Institute. This application is also related to another prior copending application Ser. No. 08/897,943, filed Jul. 21, 1997, pending entitled "Dendrimer-Based Networks Containing Lyophilic Organosilicon and Hydrophobic Polyamidoamine Nanoscopic Domains", also assigned to the Dow Corning Corporation and the Michigan Molecular Institute. These prior copending applications are referred to hereinafter as the '143 application and the '943 application, respectively.

FIELD OF THE INVENTION

This invention is directed to covalently crosslinked dendrimer networks containing nanoscopic hydrophilic domains for complexation and encapsulation of metals, metal ions, metal oxides, metal sulfides, other metal salts, or water soluble organic and organometallic molecules.

BACKGROUND OF THE INVENTION

The idea that dendrimers may function as robust, covalently bonded, and surface enclosed nanoscopic encapsulators for smaller moieties including organic molecules and inorganic ions, has attracted considerable attention. Based on results from dilute solution viscometry of poly (amidoamine) (PAMAM) dendrimers, it was hypothesized by D. A. Tomalia et al in the *Journal of the American Chemical Society*, Volume 109, Pages 1601–1603, (1987), that the intramolecular density of dendrimers with symmetrical branch cells should decrease with the radial distance from the core until a minimum is reached at certain generations above which the trend would reverse, and that the intramolecular dendrimer density would start increasing with the dendrimer radius in outer layers of these macromolecules.

Subsequent experiments with various dendrimers revealed that this hypothesis may have been accurate, and that dendrimers may in fact be globular nanoscopic entities of (i) relatively soft and spongy interiors capable of hosting smaller guest molecules, and (ii) a dense outer shell penetrable for small molecules such as solvents or classical organic and/or inorganic reagents but impenetrable to large molecules such as high molecular weight macromolecules, other dendrimers, or their parts; i.e., P. R. Dvornic et al, *Polymeric Materials Science & Engineering*, Volume 77, Pages 116–117, (1997).

For example, it was shown that poly(amidoamine) dendrimers can encapsulate $Cu^{2+}$ cations by complexing the cations into the interior depending upon the pH, i.e., M. F. Ottaviani et al, in the *Journal of the American Chemical Society*, Volume 116, Pages 661–671, (1994); and that after modification of the dendrimer surface by hydrophobes, these complexes become soluble in organic solvents such as toluene, whereas $Cu^{2+}$ cations are otherwise not soluble, i.e., Y. Sayed-Sweet et al, *Journal of Materials Chemistry*, Volume 7(7), Pages 1199–1205, (1997).

It has also been shown that (i) poly(propyleneimine) (PPI) dendrimers may function as molecular boxes for smaller organic molecules such as dyes and radicals, i.e., J. F. G. A. Jansen et al, in *Science*, Volume 266, Pages 1226–1229, (1994); that (ii) so-called arborols may be rendered chemically reactive to bind in their interior other reagents such as o-carborane delivered from their exterior, i.e., G. R. Newkome et al, in Angew. *Chem. Int. Ed. Engl.*, Volume 33, Pages 666–668, (1994); and that (iii) PAMAM dendrimers may serve as inert, confined, nanoscopic reactors, for polymerization reactions if both the monomer or monomers and the initiator are delivered into and enclosed within their interiors, i.e., V. U. Wege et al, in *Polymer Preprints*, Volume 36, Number 2, Pages 239–240, (1995).

However, these references refer to results obtained using exclusively pure dendrimers. There have been no disclosures in the art prior to our invention herein with respect to the utilization of the encapsulating ability of a dendrimer-based network, particularly wherein the dendrimer is a silicon-containing dendrimer based material. Such an invention would be unique for the reason that all known exclusively pure dendrimers are either viscous liquids or amorphous solids.

In contrast, our invention relates to what is believed to be the first dendrimer-based elastomer or plastomer prepared from a radially layered copoly(amidoamine-organosilicon) (PAMAMOS) dendrimer, or from a radially layered copoly (propyleneimine-organosilicon) (PPIOS) dendrimer, capable of functioning as (i) a nanoscopic sponge for the absorption and the encapsulation of various metal cations, and water soluble organic molecules from their water solutions; and which is capable of functioning as (ii) a nanoscopic reactor for various physical and chemical transformations of such encapsulated guest ions and molecules within their elastomeric or plastomeric network. In either case, the resulting products represent novel nanoscopic organo-inorganic composites which contain organosilicon units as an integral part of their covalently bonded structure.

Products resulting from the modifications herein of these PAMAMOS and PPIOS networks have many unique applications among which are in preparing elastomers, plastomers, coatings, sensors, smart materials, membranes, barriers, O-rings, gaskets, sealants, insulators, conductors, magnetic materials, release surfaces, absorbents, implants, sensors, indicators, and radiation sensitive materials. Additionally, because the formation of PAMAMOS and PPIOS networks can be performed in molds of various configurations and designs, these silicon-containing dendrimer-based network composites can be fabricated into objects of various shapes and sizes. This is a distinct benefit and advantage of our invention over pure dendrimers, which as noted, are viscous liquids or amorphous solids, and which possess no useful mechanical properties usually found for engineering polymeric materials.

BRIEF SUMMARY OF THE INVENTION

This invention relates to silicon-containing dendrimer-based networks prepared from radially layered copoly (amidoanrine-organosilicon) dendrimers (PAMAMOS) or other related dendrimers such as PPIOS dendrimers, having a hydrophilic interior and an organosilicon exterior which can (a) complex and/or in any other way encapsulate metal cations or elemental metals; (b) encapsulate inorganic or organometallic products formed by reaction of complexed metal cations with other inorganic, organic, or organometallic reagents; and (c) encapsulate water soluble organic or organometallic molecules delivered into the network either by diffusion from the surrounding exterior, or by formation through chemical or physico-chemical transformations occurring within the network interior.

The preparation of PAMAMOS dendrimers and PAMAMOS based dendrimer networks is described in our '143 application and in our '943 application, respectively, which applications are incorporated herein by reference.

The properties of PAMAMOS or PPIOS dendrimer-based networks depend upon the type and structure of the particular dendrimer precursor used in their preparation. This includes (i) the type and size, i.e., the generation of its poly(amidoarnine) or poly(propyleneimine) interior; (ii) the type and size, i.e., the number of layers of its organosilicon (OS) exterior; (iii) the relative ratio of the PAMAM or PPI interior and OS portions of the PAMAMOS or PPIOS dendrimer; (iv) the type of covalent bonding by which the PAMAM or PPI and the OS portions are connected; and (v) the type of covalent bonding by which PAMAMOS or PPIOS dendrimers are connected into the network.

The unique architecture of PAMAMOS as well as PPIOS networks provides a viable avenue for (i) entrapping, encapsulating, or otherwise complexing various metal cations from water solutions of their salts; and for (ii) performing reactions with such cations that result in forming various water soluble or water insoluble inorganic products containing elemental metals, metal oxides, metal sulfides, or other metal salts, which remain encapsulated within the network.

As a consequence of our invention, one skilled in the art is enabled to prepare various nanoscopic organo-inorganic composite materials in which a dendrimer network functions as a matrix in which metal(s) or inorganic products can be dispersed, having domains of precisely controlled nanoscopic size and predefined distribution, obtainable as films, sheets, coatings, membranes, or other shapes. Our invention also enables one skilled in the art to selectively encapsulate water soluble organic or organometallic molecules in the hydrophilic network domain of the elastomeric dendrimer, or to selectively encapsulate water insoluble organic and organometallic molecules in the hydrophobic network domain of the elastomeric dendrimer.

Some representative organic and organometallic molecules which may be encapsulated include pigments; dyes; indicators; light or radiation sensitizers; catalysts; electroconductive materials; non-linear optical materials; liquid crystalline materials; light emitting materials; fluorescent materials; phosphorescent materials; polymerizable monomers, polymerization initiating materials; biomedical materials; pharmaceutical products; biologically active or inactive materials; antiseptic materials; surface active agents; as well as reactive, non-reactive, functional, or non-functional compounds.

PAMAMOS or PPIOS networks containing encapsulated guest atoms or molecules provide utility in chemistry; chemical engineering; biochemistry; biology; medicinal chemistry; materials science and engineering; surface science and engineering; catalysis; reactor design; physics; membrane or barrier science and engineering; interactions of radiation and matter; cosmetics and personal care; agricultural chemistry; electronic, optoelectronic and electrical science and engineering; polymer science and engineering; metallurgy; ceramics science and engineering; chromatographic techniques; water purification; nuclear waste treatment; chemical, biological or sensor materials; and in the harvest of rare earth metals.

These and other features, objects, benefits, and advantages of our invention will become apparent from a consideration of the detailed description.

DETAILED DESCRIPTION OF THE INVENTION

Our invention relates in general to the preparation, characterization, and application of silicon modified poly (amidoamine) and poly(propyleneimine) dendrimers. In our '143 application, we have described the preparation and the surface properties of radially layered copoly(amidoamine-organosilicon) dendrimers; while in our '943 application, we have described the preparation of PAMAMOS-based dendrimer networks which contain hydrophilic and hydrophobic nanoscopic domains.

This instant application describes the utilization of these PAMAMOS or PPIOS networks as (i) elastomeric or plastomeric nanoscopic molecular sponges for the selective, non-selective, reversible, or irreversible absorption and/or entrapment of various metal cations, elemental metals, and water soluble small organic molecules; and as (ii) confined nanoscopic reactors for physico-chemical transformations of encapsulated species including the reduction of metal cations to elemental metals, the formation of metal oxides, metal sulfides, or other salts, the transformation of entrapped organic molecules by chemical reactions, and the formation of organometallic compounds by reactions of entrapped organic substrates and metal cations.

We believe that except for Group I elements, all metal cations can be absorbed and encapsulated by our PAMAMOS or PPIOS network sponges. Some representative metal cations include by way of example $Cu^{1+}$, $Cu^{2+}$, $Fe^{2+}$, $Fe^{3+}$, $Au^{3+}$, $Ag^+$, $Rh^{3+}$, $Ni^{2+}$, and $Cd^{2+}$. Organic molecules can also be encapsulated, representative of which are $C_{37}H_{27}N_3O_3 \cdot 2NaSO_3$ (methylene blue), $C_{15}H_{15}N_3O_2$ (methyl red), and a green ink present in Pilot Razor Point II pens. Other metal cations, organic molecules, and organometallic water soluble molecules may also be encapsulated.

It is particularly important to note that to our knowledge, PAMAMOS and PPIOS networks as described in our '943 application, represent the first dendrimer based products possessing any concrete, measurable, material property such as a modulus of elasticity, a tensile strength, an extensibility, or a percent of elongation. By way of comparison, other reported dendrimers and/or dendrimer-based products are viscous liquids or amorphous solids.

Thus, in particular, and according to our invention in this application, PAMAMOS or PPIOS networks are used (i) as nanoscopic molecular sponges that can absorb and encapsulate a wide variety of metal cations from their water solutions; are used (ii) to retain the thusly absorbed metal cations for long periods of time both in the dry state and when immersed in water or in an organic solvent; and are used (iii) to reversibly release and absorb once more any of the aforementioned entrapped metal cations into and from the surrounding media, provided an appropriate driving force for the transport can be established.

This application also relates to PAMAMOS or PPIOS dendrimer-based nanoscopic molecular sponges that can absorb and encapsulate various water soluble organic molecules, among which can be named as representative, organic dyes, monomers, initiators, catalysts, and pharmacologically active compounds. In addition, there is disclosed herein that PAMAMOS or PPIOS dendrimer-based networks are capable of providing a continual medium of regularly distributed nanoscopic reactors for carrying out redox reactions of the absorbed and encapsulated metal cations, converting them into elemental metals, other metal salts, metal oxides, or metal sulfides, including those metal cations that are most difficult to dissolve otherwise.

Furthermore, these PAMAMOS or PPIOS dendrimer-based networks are capable of performing various physical or chemical transformations of absorbed and encapsulated water soluble organic molecules, which molecules may be maintained as such either within the network, or which molecules may be further used in reactions with similarly absorbed or encapsulated other organic reagents, metals or metal cations, providing an avenue for the formation of numerous organic or organometallic compounds and mixtures.

For purposes herein, a PAMAMOS or PPIOS network is intended to mean and to include crosslinked PAMAMOS or PPIOS dendrimers containing hydrophilic (PAMAM or PPI) and oleophilic (OS) nanoscopic domains distributed uniformly throughout its bulk. The size of the hydrophilic PAMAM or PPI domain is predefined by selection of the PAMAM or PPI dendrimer used in preparing the precursor PAMAMOS or PPIOS dendrimer. The relative mass ratio and size of oleophilic organosilicon (OS) domains is predefined by the number and structure of the organosilicon layers built around the PAMAM or PPI dendrimer during the synthesis of PAMAMOS or PPIOS network precursors, and is also predefined by the type of crosslinking reagent (if any) used in the network forming reaction. The type and the length of crosslinking bonds connecting neighboring hydrophilic PAMAM or PPI domains is predefined by the type of organosilicon surface groups on the PAMAMOS or PPIOS dendrimer used in the crosslinking reaction, and is also predefined by the type of crosslinking reagent (if any) used in the network forming reaction.

Figure 2:
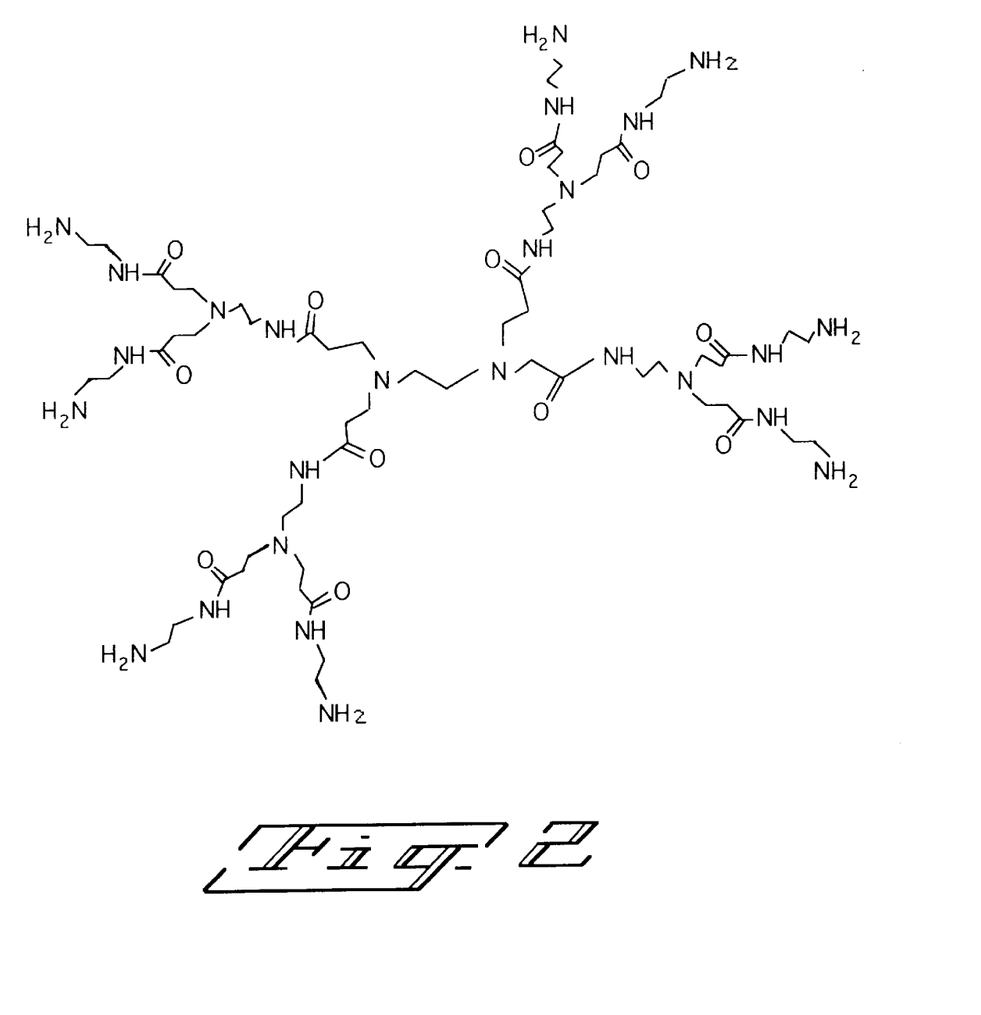
FIG. 2 shows the structure of a polyamidoamine dendrimer, in particular, an EDA core, generation 1 (G1) dendrimer, used to make a PAMAMOS dendrimer-based network such as depicted in FIG. 1.
Figure 3:
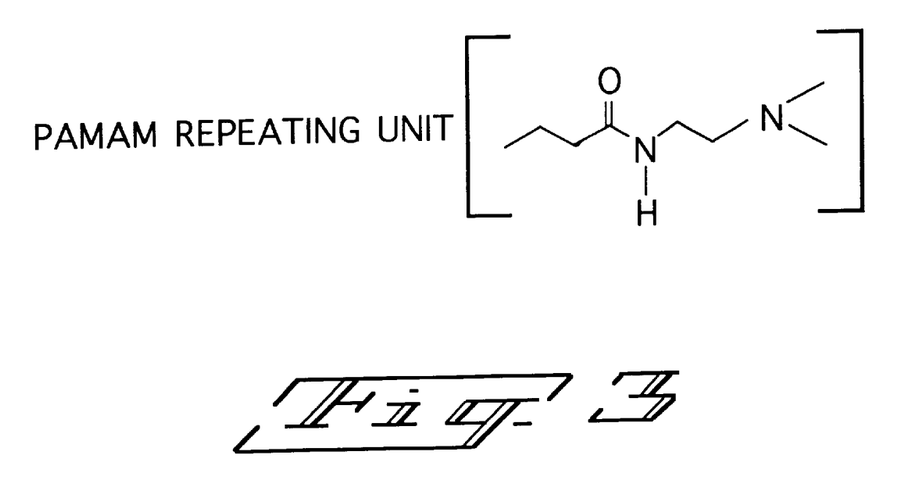
FIG. 3 shows the structure of a PAMAM repeating unit of an EDA core, Generation 1 dendrimer, of the type shown in FIG. 2.

As can be seen in FIG. 2, hydrophilic PAMAM domains contain tertiary amine branch junctures and amide connectors which are strong ligating sites for electrophilic ligands. As a result, such PAMAM domains impart a high local concentration of ligating sites to the PAMAMOS dendrimer network, and exert a high attractive potential toward electrophilic guests. This creates a strong driving force for their migration into the PAMAM domain of the network from outside the media.

This phenomenon is illustrated in examples which follow, and it has been discovered to be a property of these materials for any water soluble electrophilic substrate regardless of the nature of the organic or inorganic substrate. Thus, the phenomenon relates not only to water soluble electrophilic substrates described in our examples, but to other water soluble inorganic cations, as well as to charged or polarized organic and/or organometallic molecules.

It should be understood that the features described herein relative to our PAMAMOS dendrimers and their networks are expected to be exhibited by networks prepared from their closely related poly(propyleneimine-organosilicon) (PPIOS) dendrimers, and other radially layered copolydendrimers containing a hydrophilic interior and an outer organosilicon layer(s).

PAMAMOS precursors are obtained from PAMAM dendrimers whose surface has been partially or completely modified with functional organosilicon moieties. Related precursors can also be prepared from poly(propyleneimine) (PPI) dendrimers in the same way. Such precursors are the subject matter of our '143 application. The synthesis of such dendrimers with radially heterogeneous molecular compositions is based on different combinations of hydrophilic and hydrophobic layers. Thus, the structural units combined in these dendrimers are (a) a water soluble amidoamine repeat structure such as —[(CH$_2$)$_2$—CO—NH—(CH$_2$)$_2$—N]= or a water soluble poly(propyleneimine) repeat structure such as —[(CH$_2$)$_3$N]=, and (b) a hydrophobic organosilicon structure.

The compositions are organized as a hydrophilic poly (amidoamine) or poly(propyleneimine) interior with a hydrophobic organosilicon exterior layer. The nature of the organosilicon layer can be varied, as well as the architectural parameters of the dendrimer structure itself, including the functionality of the core, length and functionality of the branches, and the generation of each different layer, i.e., their relative thickness.

The general structure of such dendrimers and their formation can be represented as shown below:

Some examples of preferred organosilicon modifiers are compounds such as (3-acryloxypropyl)methyldimethoxysilane, (3-acryloxypropyl)bis(vinyldimethylsiloxy)-methylsilane, iodomethyldimethylvinylsilane, chloromethyldimethylvinylsilane, as well as other (3-acryloxypropyl)-functional silanes or other haloalkyl-functional silanes.

PAMAMOS dendrimers are functional, globular, nanoscopic macromolecules, having sizes ranging from about 1 to about 15 nm in diameter; molecular weights ranging from about 1,200 to 1,000,000; with a hydrophilic PAMAM interior encapsulated in a covalently connected lyophilic (oleophilic, hydrophobic) organosilicon outer shell. As such, they can be used for the controlled or uncontrolled preparation of PAMAM-organosilicon-containing dendritic networks, when containing reactive silicon-functional groups at the outer surface.

The reactive silicon-functional groups at the outer surface include any (CH$_3$)$_{3-z-y}$W$_y$Si-moiety, where X and W represent reactive groups; z is 1, 2 or 3; and y is 0, 1, or 2. For purpose of the present invention, any reactive silicon-functional group X or W can be used, including for example, —NH$_2$, —NR$_2$, mercapto (—R'SH), vinyl (—HC=CH$_2$), allyl, hydrogen, halogen, acetoxy —O(O)CCH$_3$, ureido, and alkoxy or aryloxy —OR. R represents an alkyl group containing 1–6 carbon atoms, or an aryl group such as phenyl; and R' represents the corresponding alkylene or arylene groups. The alkoxy group —OR is most preferred, however. In addition, W can be either a reactive or a non-reactive group, in which case W is preferably different from —CH$_3$ or —X.

Crosslinking of PAMAMOS or PPIOS dendrimers into dendrimer-based networks can be achieved by any number of different types of reactions, including for example:

(1) catalyzed addition reactions such as hydrosilation or thiol addition, in the case of ≡SiCH=CH$_2$, ≡Si—CH$_2$—CH=CH$_2$, ≡Si—R—SH, or ≡SiH surface functionalized dendrimers;

(2) self-catalyzed reactions such as hydrolysis with moisture or water, in the case of ≡SiCl and ≡Si—OR surface functionalized dendrimers;

(3) non-catalyzed addition reactions such as Michael Addition; and (4) condensation reactions.

The crosslinking may be performed with or without one or more added reactants, such as small molecular or oligomeric (i) difunctional reagents A$_2$, (ii) trifunctional reagents A$_3$, (iii) polyfunctional reagents A$_x$ where x is 4 or more, or (iv) by simply using moisture from the atmosphere, or intentionally added water. Representative A$_2$, A$_3$, and A$_x$ reagents are for example, organohalosilanes, tetrahalosilanes, organosilanols, organo(organooxysilanes) such as dialkoxysilanes and trialkoxysilanes, organo-H-silanes, organoaminosilanes, organoacyloxysilanes such as acetoxysilanes, organosilsesquioxanes, ureido-substituted silanes, vinyl-substituted silanes, and allyl-substituted silanes. Corresponding organic or organometalic compounds can also be employed.

Figure 1:
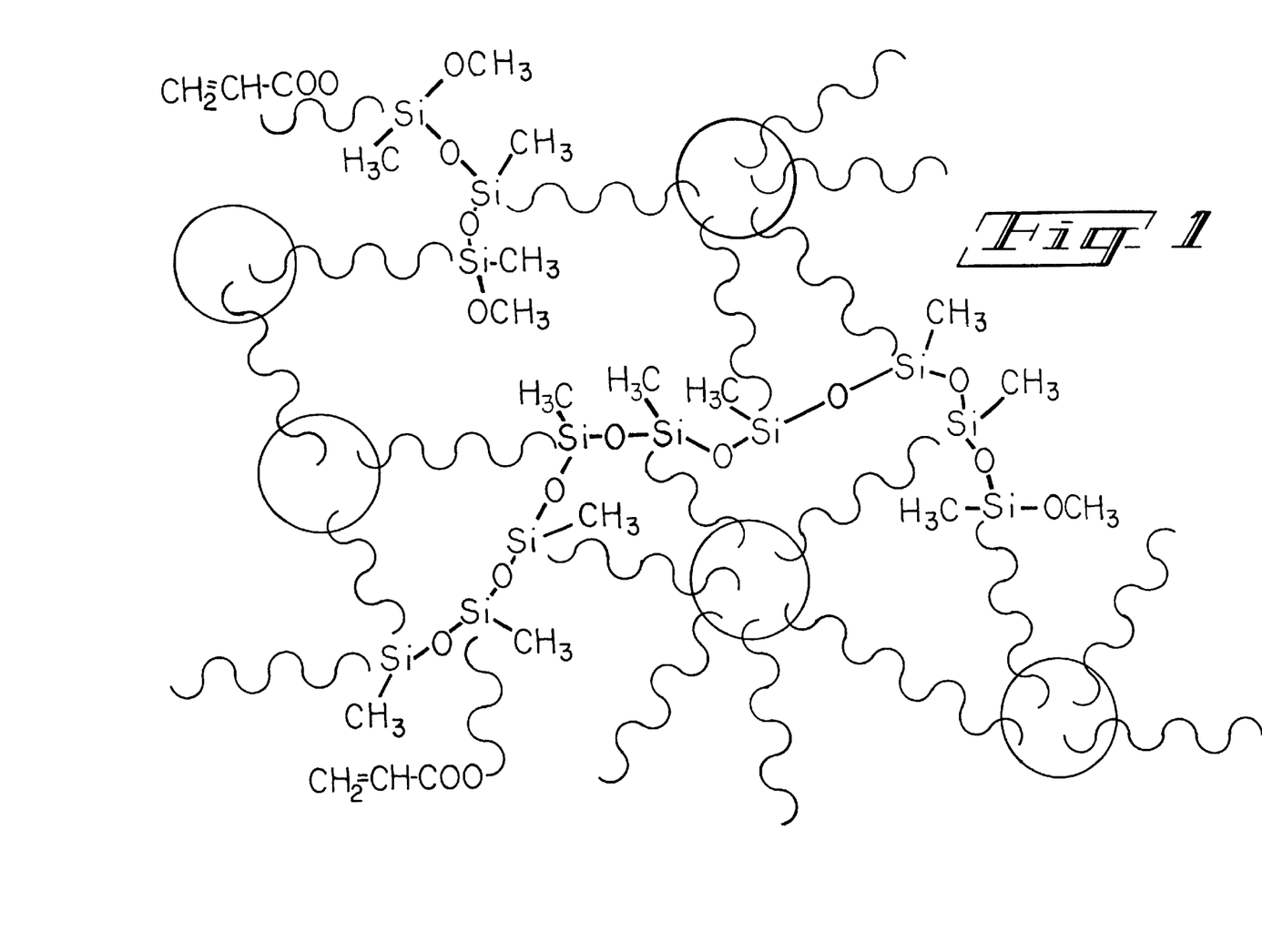
FIG. 1 is a schematic representation of a PAMAMOS or PPIOS dendrimer-based network where circles represent PAMAM or PPI portions of the base dendrimer.

Obtained elastomers are clear, highly transparent materials, exhibiting low glass temperature (T$_g$, and high thermal and thermo-oxidative stability. The exact values of these property parameters will depend of course on the PAMAM or PPI dendrimer and the organosilicon reagent used; their relative content in the resulting PAMAMOS or PPIOS copolydendrimer; the number of built outer organosilicon layers; and the type and relative amount of reagents A$_2$, A$_3$, and A$_x$. Their unique interior structure provides evenly distributed hydrophilic domains of precisely controlled nanoscopic sizes, which are covalently connected within oleophilic and elastomeric organosilicon matrix, as can be seen in FIG. 1.

The elastomers are (i) mechanically stable; (ii) they show unique separation and swelling characteristics; (iii) they can be obtained as thin films, membranes, or coatings having non-stick surfaces; (iv) they can be molded into various other shapes; and (v) they can be compounded with various additives including fillers, antioxidants, and other materials commonly employed in the preparation of silicone elastomers.

The following examples describe methods for utilizing dendrimer based nanoscopic sponges; and methods for preparing various nanoscopic molecular composites from dendrimer based networks and inorganic, organic or organometallic agents. These examples describe, in particular, (a) the absorption and encapsulation of various metal cations; (b) the absorption and encapsulation of various water soluble organic molecules; and (c) the transformation of encapsulated metal cations, including formation of elemental metals by reduction of the corresponding metal cations encapsulated within the networks, and formation of metal oxides and metal sulfides from corresponding metal cations encapsulated within the dendrimer based network.

In all of the following experiments describing the preparation of various metal-PAMAMOS network nanoscopic composites, preformed disks of PAMAMOS network films were cut into smaller pieces (referred to below as samples), and then used as described in the example. The samples were always hydrophobic in the beginning of the treatment and floated on the surface of the aqueous salt solution employed. In all cases, treatment with a metal salt solution changed both the surface characteristic and the density of the sample, as these usually spontaneously submerged under the surface of the salt solution by the end of the respective procedure.

EXAMPLE 1

Preparation of PAMAMOS dendrimers by modification of generation 3 (G3) EDA core PAMAM dendrimer with (3-acryloxypropyl)methyldimethoxysilane All glassware used in this synthesis was first dried overnight in a heating oven and then assembled while still hot. A three-necked round bottomed reaction flask was equipped with a nitrogen inlet, a stopper, and a condenser with another stopper at the top. The apparatus was evacuated using a vacuum pump, and dried with a heat-gun using several nitrogen-vacuum purging cycles. After cooling the apparatus to room temperature, it was filled with predried-nitrogen which had been passed over Drierite, and the glass stopper was replaced under a strong counter-stream of dry-nitrogen by a rubber septum. A rubber balloon was placed on top of the condenser to allow control of slight overpressures in the assembly. Syringes were also dried overnight in the oven and kept in a desiccator until used. A dendrimer placed in a flask was lyophilized overnight under high vacuum, and 2.08 g (0.30 mmol; 19.32 mmol of —NH groups) of dendrimer were obtained. The flask was flushed with dry-nitrogen, and the stopcock was replaced by a rubber septum. To the dendrimer, 19 mL of anhydrous methanol was added via a syringe through a rubber septum, and when the dendrimer had dissolved, the obtained solution was transferred with another syringe to the apparatus. To this solution, 5.5 mL (23.18 mmol; 1.2 excess relative to —NH groups) of (3-acryloxypropyl)methyldimethoxysilane H$_2$C=CHCOO(CH$_2$)$_3$Si(OCH$_3$)$_2$CH$_3$ was added, and the mixture was stirred under nitrogen at room temperature for the entire duration of the reaction time. The % of dendrimer surface modification was determined by $^1$H Nuclear Magnetic Resonance (NMR). For this determination, about 1 mL aliquot of the reaction mixture was used. The sample was removed with a syringe and transferred into another two-necked round bottomed flask equipped with a rubber septum and nitrogen inlet. Methanol was evaporated under vacuum and replaced with 0.7 mL of deuterated chloroform (CDCl$_3$). The resulting PAMAMOS dendrimer was stable as long as it was kept in an anhydrous environment. To complete the synthesis, chloroform (5 mL portions) was added to the reaction mixture initially every 24 hours, then every other day after 3 days. After five days of total reaction time, the entire solvent containing mixture was evaporated under vacuum, and the solvent was replaced by 9 mL of pure chloroform. A summary of the changes in solvent composition is provided in Table 1, together with the % of —NH dendrimer surface modification.

TABLE 1

Preparation of PAMAMOS dendrimer from
Generation 3 EDA core PAMAM dendrimer

| Reaction Time (days) | Total volume of solvent (mL) | %MeOH/%CHCl$_3$ (v/v) | $c_{-NH\ groups}$ (mol/L) | % modification of –NH groups |
|---|---|---|---|---|
| 0 | 19 | 100/0 | 1.02 | 0 |
| 1 | 18 | 100/0 | 1.02 | 77.6 |
| 1 | 23 | 78/22 | 0.8 | — |
| 2 | 22 | 78/22 | 0.80 | 83.4 |
| 2 | 27 | 64/36 | 0.65 | — |
| 3 | 26 | 64/36 | 0.65 | 85.1 |
| 3 | 31 | 54/46 | 0.55 | — |
| 5 | 30 | 54/46 | 0.55 | 83.7 |
| 5 | 19 | 0/100 | 0.87 | — |
| 6 | 18 | 0/100 | 0.87 | 87.6 |
| 7 | 17 | 0/100 | 0.87 | 87.0 |
| 10 | 16 | 0/100 | 0.87 | 87.4 |

At 87% NH substitution, $^1$H NMR in CDCl$_3$ showed the following: 0.02 ppm (s; ≡Si—CH$_3$); 0.52 ppm (m; —CH$_2$—Si≡); 1.61 ppm (m; —COO—CH$_2$—CH$_2$—CH$_2$—Si≡); 2.4–3.6 ppm (PAMAM dendrimer protons); 3.40 ppm (s; ≡Si—O—CH$_3$); 3.94 ppm (t; PAMAM-COO—CH$_2$); 4.02 ppm (t, CH$_2$=CH—COO—C$_2$—); 5.68–6.32 ppm (d+dxd+d; CH$_2$=CH—COO—). $^{13}$C NMR in CDCl$_3$ showed the following: —6.18 ppm (≡Si—CH$_3$); 8.89 ppm (—CH$_2$—Si≡); 21.82 ppm (—COO—CH$_2$—CH—CH$_2$—Si≡); 32.37 ppm (=N—CH$_2$—CH$_2$—COO—(CH$_2$)$_3$—Si≡); 33.54 ppm (—CH$_2$—CO—NH—); 34.75 ppm (—NH—CH$_2$—CH$_2$CH$_2$—COO-(CH$_2$)$_3$—Si≡); 37.10 and 37.29 ppm (—CO—NH—CH$_2$—); 38.76 ppm (—CO—NH—CH$_2$—CH$_2$—NH—(CH$_2$)$_2$—COO—); 44.43 ppm (—CO—NH—CH$_2$—CH$_2$—NH—(CH$_2$)$_2$—COO—); 48.37 ppm (—NH—CH$_2$—CH$_2$—COO—(CH$_2$)$_3$—Si≡); 48.92 ppm (—CO—NH—CH$_2$—CH$_2$—N—((CH$_2$)$_2$—COO—)$_2$); 49.54 ppm (—CO—NH—CH$_2$—CH$_2$—N=); 49.89 ppm (≡Si—O—CH$_3$); 51.33 ppm (=N—CH$_2$—CH$_2$—COO—); 52.20 and 52.60 ppm (=N—CH$_2$—CH$_2$—CONH—); 66.31 ppm (=N—(CH$_2$)$_2$—COO—CH$_2$—); 128.32 and 130.18 ppm (CH$_2$=CH—); 172.21 and 172.31 ppm (—CH$_2$—CH$_2$—COO— and —CO—NH—) and the unreacted acrylate reagent: –6.18 ppm (≡Si—CH$_3$); 8.89 ppm (—CH$_2$—Si≡); 21.82 ppm (—COO—CH$_2$—CH$_2$—CH$_2$—Si≡); 49.89 ppm (≡Si—O—CH$_3$); 66.36 ppm (CH$_2$=CH—COO—CH$_2$—); 128.32 and 130.18 ppm (CH$_2$=H—); and 165.92 ppm (CH$_2$=CH—COO—).

EXAMPLE 2

Preparation of PAMAMOS dendrimer-based network containing lyophilic organosilicon and hydrophilic poly(amidoamine) nanoscopic domains A PAMAMOS dendrimer obtained as described in Example 1 after 24 hours of reaction time having on average 84.5 methoxysilyl- end-groups per molecule was used for network preparation. 1 mL of the reaction mixture (composed of 0.015 mmol of dendrimer and 0.5 mmol of (3-acryloxypropyl)methyldimethoxysilane in 1 mL of methanol) was withdrawn from the reactor, poured into an open aluminum pan, and left exposed to atmospheric air loosely covered with a piece of aluminum foil to prevent contamination with dust. In contact with atmospheric moisture, and in the presence of the basic PAMAM dendrimer interior, hydrolysis of the methoxysilyl-surface groups took place slowly, with methanol by-product and solvent slowly evaporating. To monitor the course of this occurrence, the pan containing the sample was periodically weighted, until after about 5 days of total reaction time, when no further change of its weight could be detected. Thermal properties of the obtained network sample were examined by Differential Scanning Calorimetry (DSC), and by Thermogravimetric Analysis (TGA) under nitrogen. DSC analysis was performed from –20° C. to 100° C. at a heating rate of 10° C./minute, while TGA was performed by heating from room temperature (20–25° C.) to 1,000° C. at a heating rate of 20° C./minute. Glass temperature (Tg) was found at –7° C. after one month after preparation. TGA showed no weight loss until about 200° C., above which two maxima in the thermograms were observed at 290 and 380° C. Weight loss at 290° C. was 17% of the original weight. Weight loss at 380° C. was 71% of the original weight.

EXAMPLE 3

Permeability of a PAMAMOS dendrimer-based network to a water solution of methylene blue A disc cut out of the PAMAMOS network sample synthesized in Example 2 was placed in a filter holder attached to a syringe, and the whole assembly was connected to a vacuum bottle. A solution of methylene blue in water (concentration=2.71×10$^{-3}$ mol/L) was introduced into the syringe, and a partial vacuum was applied to the vacuum bottle. In the beginning, methylene blue permeated the membrane as indicated by blue drops passing through the filter assembly, but then the membrane became impermeable to further flow. Upon opening the filter holder it was observed that the originally colorless, completely transparent membrane turned slightly blue during this experiment. The color could not be washed away by rinsing the membrane several times in water, and when it was attempted to reuse the blue film, it was found to be water impermeable. This was a clear indication that the hydrophilic methylene blue had been encapsulated within the PAMAM domains of the network, thus preventing further permeation of even water molecules.

EXAMPLE 4

Encapsulation of methylene blue in the PAMAMOS dendrimer-based network of Example 2

A solution of methylene blue in water was prepared, and a sample of the PAMAMOS network prepared in Example 2 was immersed in the solution for about 24 hours. The obtained sample was blue, and the coloration remained even after several repeated cycles of rinsing and immersion in water.

EXAMPLE 5

Encapsulation of methyl red in the PAMAMOS dendrimer-based network of Example 2

A solution of methyl red in acetone was prepared, and a sample of the PAMAMOS network prepared in Example 2 was immersed in the solution for about 24 hours. The obtained sample was orange, and the coloration remained present even after several repeated cycles of rinsing and immersion in water or acetone.

EXAMPLE 6

Encapsulation of green ink in the PAMAMOS dendrimer-based network of Example 2

Green ink obtained from a Pilot Razor Point II pen was dissolved in water, and a sample of the PAMAMOS network prepared in Example 2 was immersed in the solution for about 24 hours. The obtained sample was bright green, and the coloration remained even after several repeated cycles of rinsing and immersion in water.

EXAMPLE 7

Preparation of copper (II)—PAMAMOS dendrimer-based network nanoscopic composite

A sample of the PAMAMOS network prepared in Example 2 (21.84 mg) was immersed in a solution of copper sulfate in water [concentration (c)=0.44 mol/L] for about 16 hours. The sample turned bright blue during this treatment, and its coloration remained even after several cycles of rinsing or immersion in pure water for several days. The sample was dried overnight under vacuum, and its weight was determined to be 24.00 mg. Its thermal properties were examined by DSC and TGA under nitrogen. DSC was performed from −100° C. to 100° C. at a heating rate of 10° C./mn, and TGA was performed from room temperature to 1,000° C. at a heating rate of 20° C./mn. The sample showed a Tg of 44.6° C. and a two step degradation process, with the maxima in weight loss at 275° C. (weight lost in this step was 15% of the original), and at 360° C. (59% of the original weight lost), respectively. A weight loss started at about 75° C., showed a maximum at 146° C. and totaled about 2.6% of the original weight. This weight loss was not related to network stability, but represented liberation of water trapped in the hydrophilic domains of the sample.

EXAMPLE 8

Release of copper (II) from the copper (II)-PAMAMOS dendrimer-based network nanoscopic composite of Example 7

A sample of the PAMAMOS network containing copper (II) in Example 7 was immersed in a 0.1 N solution of HCl in water for about 20 hours, taken out from the acid, rinsed several times with water, and immersed in water for another several hours. This treatment resulted in complete discoloration of the sample, which upon completion of the procedure, appeared the same as the original sample obtained in Example 2. The discolored sample was dried overnight under partial vacuum and subjected to DSC from −60° C. to 80° C. at a heating rate of 10° C./mn to show a Tg of 28° C.

EXAMPLE 9

Preparation of copper (I)-PAMAMOS dendrimer-based network nanoscopic composite

A sample of the PAMAMOS network of Example 2 was immersed for about 24 hours in a green saturated solution of copper (I) chloride in water. When it was removed, the sample was blue-green, and this coloration remained even after several cycles of rinsing by and immersion in pure water.

EXAMPLE 10

Preparation of iron (II)-PAMAMOS dendrimer-based network nanoscopic composite

A sample of the PAMAMOS network of Example 2 was immersed in a saturated solution of iron (II) sulfate in water for about 24 hours. When it was removed, the sample was yellow and no longer transparent. The coloration remained even after several cycles of rinsing by and immersion in water. After drying overnight in partial vacuum, the sample showed a Tg of 66° C. when examined by DSC from −50° C. to 100° C. at a heating rate of 10° C./mn.

EXAMPLES 11a TO 11d

Preparation of a platinum (O)-PAMAMOS nanoscopic composite

EXAMPLE 11a

Preparation of a PAMAMOS dendrimer having vinylsilyl-surface groups 3.66 g (0.53 mmol, 33.90 mmol of —NH groups) of a generation 3 EDA core PAMAM dendrimer which had been lyophilized overnight, was placed in a round-bottom three-neck reaction flask equipped with a stopper, a TEFLON coated magnetic stirring bar, and a vertical condenser with a nitrogen inlet at its top, and dissolved in 34.5 mL of N,N-dimethyl formamide (DMF). Vinyl(chloromethyl) dimethylsilane $H_2C=CH(ClCH_2)Si(CH_3)_2$ (6.1 mL; 40.45 mmol) and sodium bicarbonate (4.03 g) were added, and the mixture was stirred and heated under nitrogen atmosphere for six days. An aliquot of the obtained product was dissolved in deuterated methanol ($CD_3OD$), centrifuged and analyzed by $^1H$ NMR. This analysis showed that 85% of the original —NH surface groups had been modified, and that the obtained dendrimer contained on average 54.4 vinyl groups per molecule. The salts were filtered from the reaction mixture, and the filtrate was dialyzed, first in a 50/50 methanol/water mixture, and then in pure methanol. At the end of this procedure, methanol was evaporated, and the obtained dendrimer was dried under a partial vacuum.

EXAMPLE 11b

Attempt at hydrosilation of the PAMAMOS dendrimer of Example 11a

A hydrosilation reaction was attempted to convert the dendrimer of Example 11a into its triethylsilyl-homologue in the usual manner. For this reaction, 0.79 g. (0.064 mmol, 3.5 mmol of vinyl groups), of the PAMAMOS dendrimer of Example 11a were placed in a two-neck round-bottom flask equipped with a stopper, a TEFLON® coated magnetic stiring bar, and a vertical condenser having a nitrogen inlet at its top. 0.03 mL of platinum (Pt) catalyst (a 0.3% by weight solution of platinum divinyltetramethyldisiloxane complex in p-xylene) was added, followed by freshly distilled triethylsilane $(C_2H_5)_3SiH$ (0.67 mL; 0.49 g; 4.2 mmol) and 10 mL of tetrahydrofuran (THF). The reaction mixture was stirred and heated at 40° C. for 7 days under nitrogen, then at 60° C. for another 3 days. Because Fourier-Transform Infrared Spectroscopy F(TIR) and $^1H$ NMR showed no reaction commencing after this treatment, another portion of 0.16 mL (1 mmol) of triethylsilane and 0.03 mL of Pt catalyst were added after 9 days of total reaction time. The reaction mixture was then purified by dialysis in acetone, and after evaporation of the solvent, the obtained sample was dried overnight under vacuum, diluted in $CDCl_3$, and analyzed by $^{29}Si$ NMR. Two peaks were observed, indicating unreacted —$CH_2Si(Me)_2(CH=CH_2)$ groups at —8.69 ppm, and a silicone grease used in assembling the apparatus at −21.94 ppm. No signal resulting from the modification of the vinylsilyl-starting dendrimer could be found. This shows that the expected hydrosilation reaction did not occur, and this is due to the withdrawal of platinum catalyst from the reaction mixture by complexation of the platinum (0) by the PAMAM interior of the PAMAMOS dendrimer.

EXAMPLE 11c
Preparation of a PAMAMOS dendrimer having vinylsilyl-surface groups Vinyl(chloromethyl)dimethylsilane (7.2 mL; 6.54 g; 48.54 mmol), sodium iodide (8.02 g; 53.4 mmol; [NaI]/[ClR]=1.1), 15-Crown-5 ether (0.48 mL; 0.53 g; 2.43 mmol, 5%/[—Cl]), and DMF (10 mL), were introduced under nitrogen into a round-bottomed reaction flask equipped with a mechanical stirrer and a vertical condenser having a nitrogen inlet at the top. The reaction mixture was stirred and heated at 60° C. overnight. In another flask, a Generation 3 EDA core PAMAM dendrimer having 32 —$NH_2$ surface groups was lyophilized from methanol. After keeping the dendrimer under reduced pressure overnight, 4.37 g (0.63 mmol; 40.45 mmol of —NH) of a thusly obtained crispy solid was dissolved in 30 mL of DMF and added to the reaction mixture, followed by 6.14 g of sodium bicarbonate. The reaction mixture was heated to 80° C., and from time to time, samples were taken for $^1H$ NMR analysis, which was used to monitor the progress of the reaction. Stirring and heating were stopped after 13 hours, when complete modification of the —NH groups had been achieved. The obtained mixture was filtered, and the filtrate was dialyzed (Spectra/Por 7; MWCO 3500), first in a water/methanol mixture, and then in pure methanol. The isolated PAMAMOS dendrimer product was dried under vacuum overnight. Its analysis showed that the starting PAMAM dendrimer had been 93% modified. 4.87 g of the PAMAMOS dendrimer were obtained after purification, a 60.5% yield.

EXAMPLE 11d
Preparation of a PAMAMOS dendrimer having triethylsilyl-surface groups by hydrosilation of the PAMAMOS dendrimer of Example 11c 0.76 g (0.059 mmol, 3.54 mmol of vinylsilyl- groups) of the PAMAMOS dendrimer of Example 11c was lyophilized in a one-neck round-bottom flask overnight from methanol. The lyophilized dendrimer was then dissolved in 3 mL of ethylene glycol diethylether which had been dried over calcium hydride, triethylsilane (0.68 mL; 0.49 g; 4.25 mmol), and an excess of platinum catalyst (0.3% by weight platinum as a solution of a platinum-divinyltetramethyldisiloxane complex in p-xylene; 0.1 mL; i.e., the same catalyst used in Example 11b). This amount of catalyst was large enough to saturate all potential complexation sites of the PAMAM interior of the PAMAMOS dendrimer with one Pt (0) equivalent for every 6 PAMAM nitrogens introduced in the flask. The reaction mixture was stirred under nitrogen at 100° C. for 41 hours. After that time, a sample of the mixture was withdrawn, dissolved in $CDCl_3$, and analyzed by $^1H$ NMR. Only a small amount of unreacted vinyl groups was observed, clearly indicating that the reaction had been successfully performed. The obtained dendrimer was no longer soluble in methanol, but it was easily soluble in THF or chloroform, and was purified by dialysis from THF.

EXAMPLE 12
Preparation of rhodium (III)-PAMAMOS dendrimer-based network nanoscopic composite A sample of the PAMAMOS dendrimer-based network of Example 2 was immersed in a deep red water solution of 100 mM of rhodium chloride ($RhCl_3$) for about 16 hours. The sample developed a dark yellow color due to encapsulation of $Rh(OH)_3$, and the color did not change after immersion in a dilute hydrazine ($H_2NNH_2$) solution. For example, it is known that rhodium (III) chloride exists in the form of a mixed aqua-complex between $[Rh(H_2O)_6]^{3+}Cl_3$ and $RhCl_3$ when dissolved in water. These complexes are soluble only in acidic media, because the solubility constant ($K_{sp}$) of $Rh(OH)_3$ is only about $1\times10^{-23}$. Thus, upon complexation from a dilute aqueous solution in the form of $[RhN_4Cl_4]^-$, these complexes hydrolyze within the PAMAM interior, and lose HCl to the tertiary nitrogens present in the PAMAM interior, and are trapped as $Rh(OH)_3$.

EXAMPLE 13
Preparation of copper (II) sulfide-PAMAMOS dendrimer-based network nanoscopic composite A sample of the PAMAMOS dendrimer-based network of Example 2 was immersed in a 10 mM copper (II) acetate solution and soaked for about 16 hours. The sample developed a blue coloration indicating complexation of copper (II) ions by the nitrogen ligating sites of the PAMAMOS dendrimer hydrophilic interior. The sample was rinsed with water, wiped dry with a paper towel, and placed in a scintillation vial. The vial was flushed with nitrogen, filled with hydrogen sulfide gas, capped, and sealed with a paraffin. After 8 hours, the sample developed a light brown color, indicating formation of copper sulfide within the dendrimer based network.

EXAMPLE 14
Preparation of nickel (II) sulfide-PAMAMOS dendrimer-based network nanoscopic composite A sample of the PAMAMOS dendrimer-based network of Example 2 was immersed in a 10 mM nickel (II) acetate solution and soaked for about 16 hours. After completion of this treatment, the sample was rinsed with water, wiped dry with a paper towel, and placed in a scintillation vial. The vial was flushed with $N_2$, filled with $H_2S$ gas, capped and sealed with paraffin. After 8 hours, the sample developed a dark gray color, indicating formation of nickel sulfide within the dendrimer based network.

EXAMPLE 15
Preparation of cadmium (II) sulfide-PAMAMOS dendrimer-based network nanoscopic composite A sample of the PAMAMOS dendrimer-based network of Example 2 was immersed in a 10 mM cadmium (II) acetate solution and soaked for about 16 hours. After completion of this treatment, the sample was rinsed with water, wiped dry with a paper towel, and placed in a scintillation vial. The vial was flushed with $N_2$, filled with $H_2S$ gas, capped and sealed with paraffin. After 16 hours of this treatment, the sample remained transparent, but developed a yellow color, indicating the formation of cadmium sulfide nanoparticles within the dendrimer-based network. An ultraviolet (UV-visible) spectrum of the sample indicated a cutoff at 520–530 nm. Since the particle size of cadmium sulfide is proportional to the spectral cutoff, it was estimated that the particle size of cadmium sulfide in this example was between 5–10 nm (50–100 Å).

EXAMPLE 16

Preparation of copper (0)-PAMAMOS dendrimer-based network nanoscopic composite

A sample of the PAMAMOS dendrimer-based network of Example 2 was immersed in a 10 mM copper (II) acetate solution and soaked for about 16 hours. The sample became blue during this treatment, indicating complexation of copper (II) ions by the nitrogen ligating sites of the PAMAMOS dendrimer hydrophilic interior. After completion of treatment, the sample was rinsed with water and wiped dry with a paper towel. Upon subsequent immersion in a 100 mM aqueous hydrazine solution, the sample developed a characteristic metallic copper color, indicating formation of a metallic copper dendrimer-based network nanoscopic composite.

EXAMPLE 17

Preparation of gold (0)-PAMAMOS dendrimer-based network nanoscopic composite

A sample of the PAMAMOS dendrimer-based network of Example 2 was immersed in a yellow solution of 40 mg of gold trichloride acid $[H(AuCl_4)].XH_2O]$ in 10 mL of water and soaked for 30 min. During this treatment, the sample developed a dark wine-red color, indicating encapsulation of gold III hydroxide $[Au(OH)_3]$, which spontaneously decomposes under basic conditions or when exposed to light. Upon subsequent immersion into a 100 mM aqueous hydrazine solution, the sample instantaneously turned dark-red. It is noted that Au (III) chloride exists in an HCl solution as an $H(AuCl_4)$ complex. Upon extraction from such a solution by complexation in the interior of a dendrimer, this $H(AuCl_4)$ complex hydrolyzes, and loses HCl to the tertiary nitrogens, and is entrapped as $Au(OH)_3$, which subsequently decomposes. An UV-visible spectrum of the sample showed a cutoff above 700 nm. Since the corresponding cutoff for gold nanoparticles is about 550 nm, this observation indicated that the bulk of the network sample had an interconnected channel structure.

EXAMPLE 18

Preparation of silver (0)-PAMAMOS dendrimer-based network nanoscopic composite (i.e., an elastomeric silver mirror)

A sample of the PAMAMOS dendrimer-based network of Example 2 was immersed in a 100 mM silver trifluoromethanesulfonate $(CF_3SO_3Ag)$ solution and soaked for 16 hours in the dark. Upon completion of this treatment, the sample was rinsed with water and wiped dry with a paper towel. One end of the sample was then treated with a drop of a 100 mM aqueous hydrazine solution as reducing agent, while the other end was treated simultaneously with a drop of 0.1 M $Na_2S_2O_3$ solution. As expected, the sodium thiosulfate solution removed encapsulated silver cations and made its end of the sample clear and transparent, whereas the other end treated with the reducing agent turned to a silver mirror which retained the flexibility of the original sample.

Other variations may be made in compounds, compositions, and methods described herein without departing from the essential features of our invention. The forms of invention are exemplary only and not intended as limitations on their scope as defined in the appended claims.

We claim:

1. A composition comprising (i) a metal cation, (ii) a metal salt, (iii) a metal oxide, (iv) an elemental metal, (v) a water soluble organic molecule, or (vi) a water soluble organometallic molecule, adsorbed, absorbed, or encapsulated in a dendrimer-based network having hydrophilic and hydrophobic nanoscopic domains, the dendrimer-based network comprising a crosslinked product of a radially layered copolydendrimer having a hydrophilic interior, and a hydrophobic organosilicon exterior terminated with reactive end groups, the copolydendrimer being prepared by reacting a hydrophilic dendrimer having $—NH_2$ surface groups, with an organosilicon compound, in the presence of a solvent.

2. A composition according to claim 1 in which the reactive end groups of the copolydendrimer are hydrolyzable groups, and the copolydendrimer is crosslinked to form a dendrimer-based network having hydrophilic and hydrophobic nanoscopic domains.

3. A composition according to claim 1 in which the copolydendrimer is crosslinked by contacting the copolydendrimer with a crosslinking agent selected from the group consisting of low molecular weight or oligomeric (i) difunctional reagents, (ii) trifunctional reagents, and (iii) polyfunctional reagents.

4. A composition according to claim 3 in which the crosslinking agent is selected from the group consisting of organohalosilanes, tetrahalosilanes, organosilanols, organo (organooxysilanes), organo-H-silanes, organoaminosilanes, organoacyloxysilanes, organosilsesquioxanes, ureido-substituted silanes, vinyl-substituted silanes, and allyl-substituted silanes; and the hydrophilic interior of the copolydendrimer is selected from the group consisting of polyamidoamine and polypropyleneimine.

5. A composition according to claim 1 in which the reactive end groups on the hydrophobic organosilicon exterior of the copolydendrimer are moieties conforming to the formula $(CH_3)_{3-z-y}X_zW_ySi—$, wherein X represents the reactive end group; W is a reactive or non-reactive group different from $—CH_3$ or $—X$; y is 0, 1, or 2; z is 1, 2 or 3; and z+y is 1, 2, or 3.

6. A composition according to claim 5 in which the reactive end group X is selected from the group consisting of $—NH_2$, $—NR_2$, $—R'SH$, $—HC=CH_2$, $—CH_2—CH=CH_2$, hydrogen, halogen, $—O(O)CCH_3$, $—NH(O)CNH_2$, alkoxy, and aryloxy; wherein R represents an alkyl group containing 1–6 carbon atoms or an aryl group; and R' represents an alkylene group containing 1–6 carbon atoms or an arylene group; and the hydrophilic interior of the copolydendrimer is selected from the group consisting of polyamidoamine and polypropyleneimine.

7. A composition according to claim 1 in which the organosilicon compound is a (3-acryloxypropyl)-functional silane or a haloalkyl-functional silane.

8. A composition according to claim 7 in which the organosilicon compound is (3-acryloxypropyl) methyldimethoxysilane, (3-acryloxypropyl)bis(vinyldimethylsiloxy)-methylsilane, iodomethyldimethylvinylsilane, or chloromethyldimethylvinylsilane.

9. A composition according to claim 1 in which the metal cation is selected from the group consisting of $Cu^{1+}$, $Cu^{2+}$, $Fe^{2+}$, $Fe^{3+}$, $Au^{3+}$, $Ag^+$, $Rh^{3+}$, $Ni^{2+}$, and $Cd^{2+}$.

10. A composition according to claim 1 in which the elemental metal is Pt(O).

11. A composition according to claim 1 in which the water soluble organic molecule and the water soluble organometallic molecule is selected from the group consisting of pigments, dyes, indicators, light sensitizers, radiation sensitizers, catalysts, electro-conductive materials, non-linear optical materials, liquid crystalline materials, light emitting materials, fluorescent materials, phosphorescent materials, polymerizable monomers, polymerization initiating materials, biomedical materials, pharmaceutical products, biologically active materials, biologically inactive materials, antiseptic materials, and surface active agents.

12. A composition according to claim 11 in which the water soluble organic molecule is selected from the group consisting of $C_{37}H_{27}N_3O_3 \cdot 2NaSO_3$ (methylene blue), $C_{15}H_{15}N_3O_2$ (methyl red), and green ink.

13. A method of making organic compounds, inorganic compounds, and organometallic compounds, comprising reacting an organic reagent, an inorganic reagent, or an organometallic reagent, with the metal cation in the composition defined in claim 1.

14. A method of making elemental metals, metal oxides, metal sulfides, and other metal salts, comprising reducing the metal cation in the composition defined in claim 1.

15. A method of making metal oxides comprising oxidizing the metal cation in the composition defined in claim 1.

16. A method of making organic compounds, organometallic compounds, and mixtures of organic compounds and organometallic compounds, comprising reacting an organic reagent with the water soluble organic molecule or the water soluble organometallic molecule in the composition defined in claim 1.

17. A method of recovering a metal cation or a mixture of metal cations from water comprising contacting water with a dendrimer-based network having hydrophilic and hydrophobic nanoscopic domains, the dendrimer-based network comprising a crosslinked product of a radially layered copolydendrimer having a hydrophilic interior, and a hydrophobic organosilicon exterior terminated with reactive end groups, the copolydendrimer being prepared by reacting a hydrophilic dendrimer having —$NH_2$ surface groups, with an organosilicon compound, in the presence of a solvent.

* * * * *